United States Patent Office 2,913,720
Patented Nov. 17, 1959

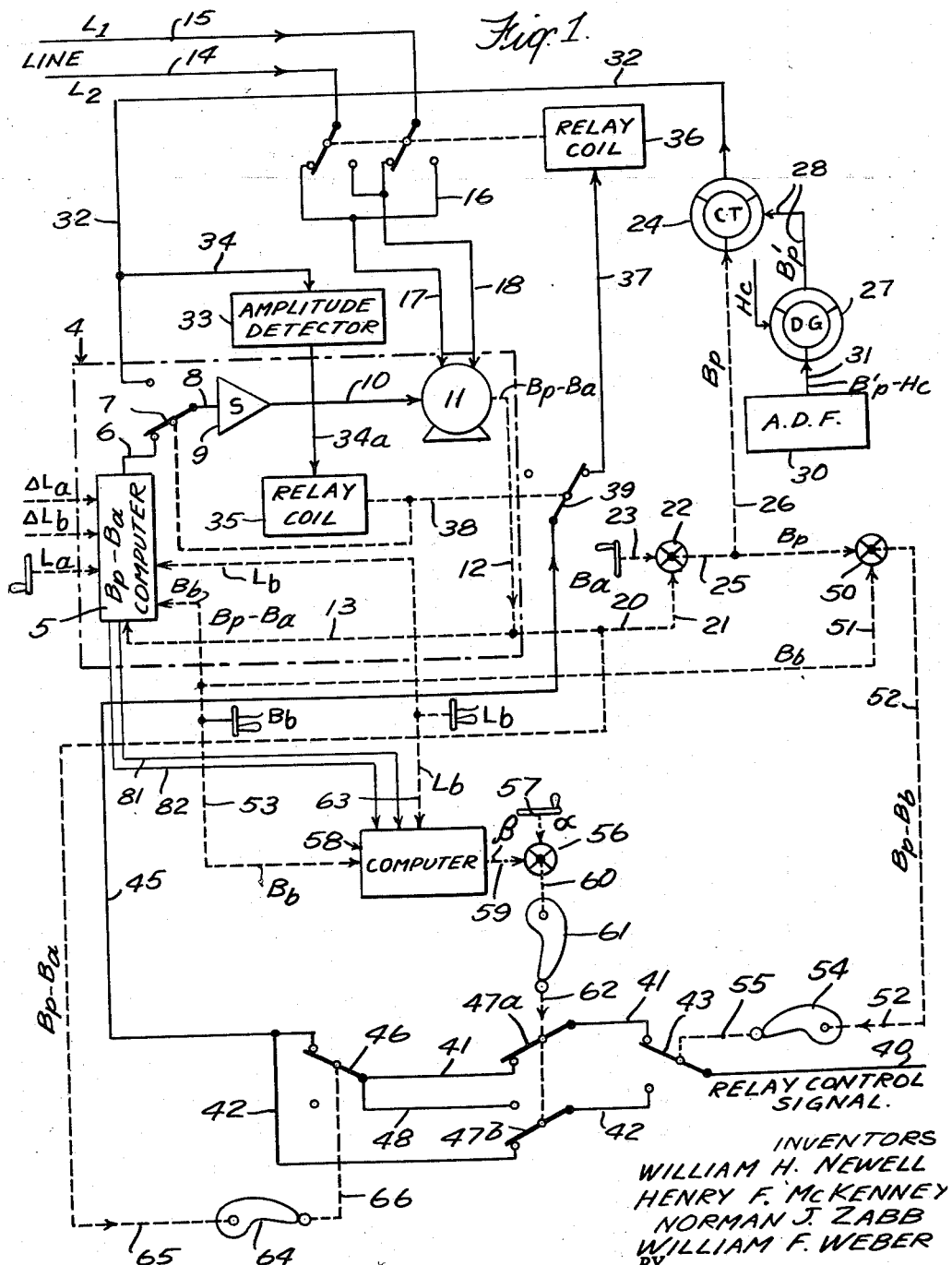

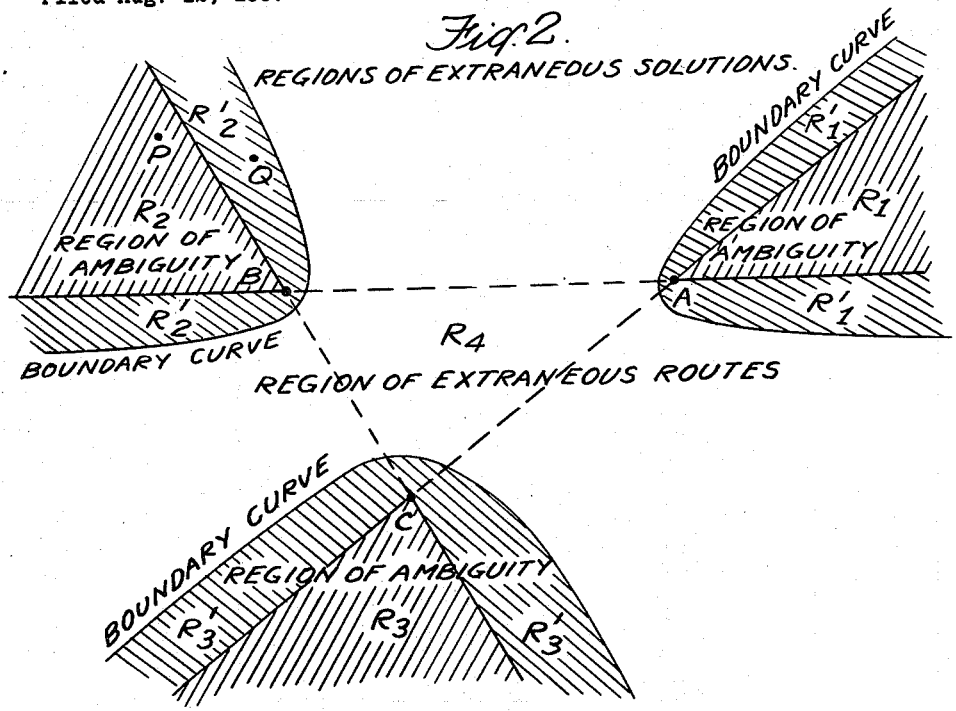
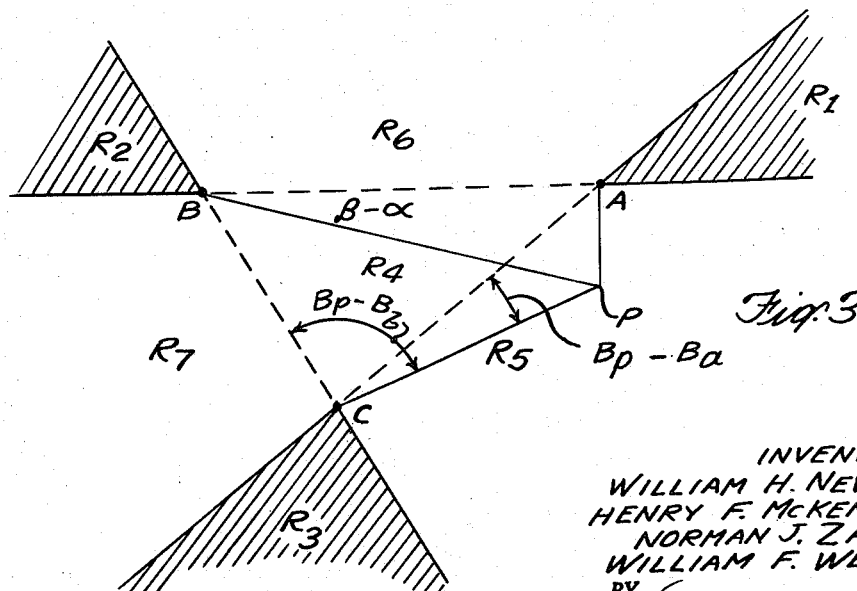

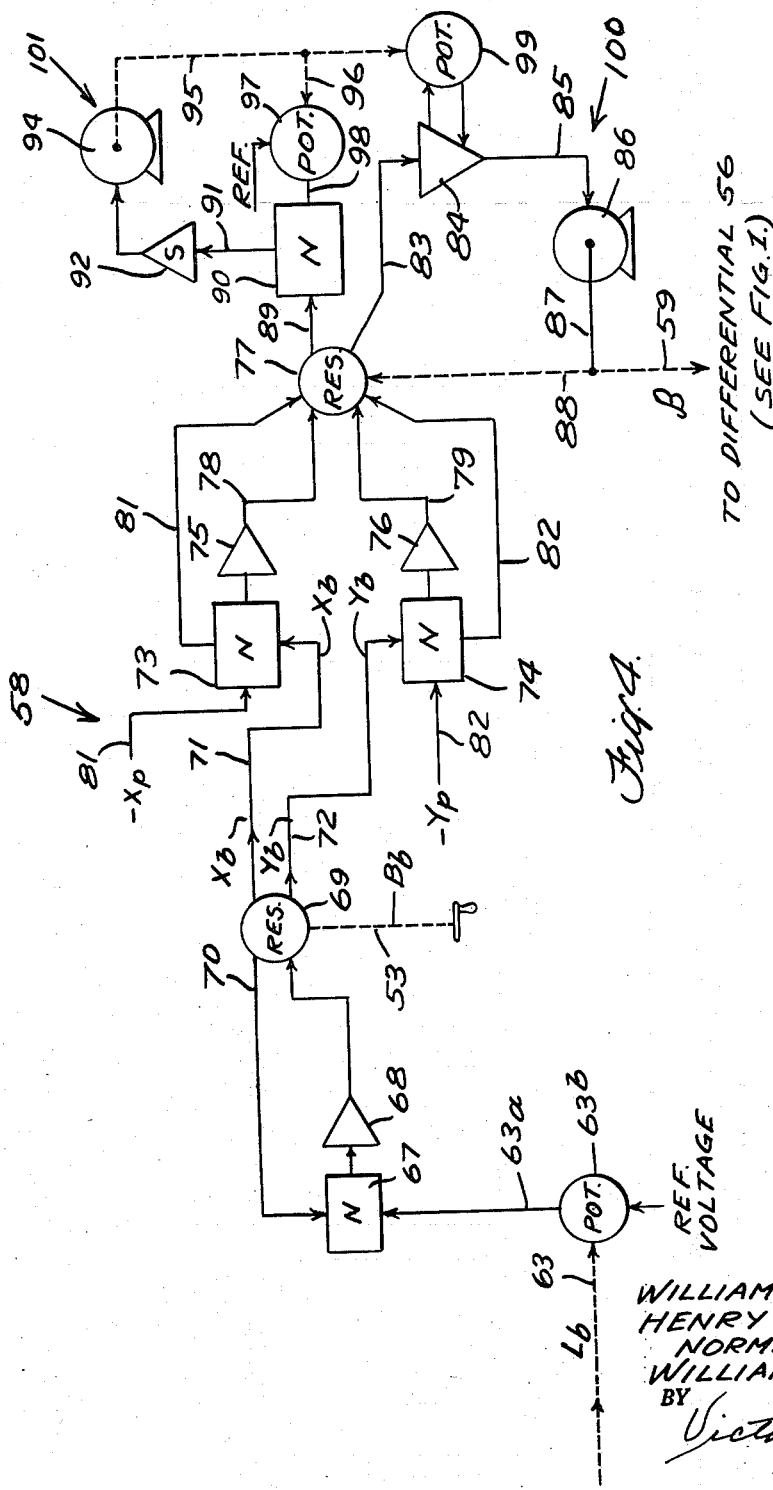

2,913,720

AUTOMATIC DIRECTION FINDER AMBIGUITY RESOLUTION

Norman J. Zabb, Brooklyn, and William H. Newell, Mount Vernon, N.Y., and Henry F. McKenney, Weston, Mass., and William F. Weber, Suffolk County, N.Y., assignors to Sperry Rand Corporation, Ford Instrument Company Division, Long Island City, N.Y., a corporation of Delaware Application August 12, 1957, Serial No. 678,263

5 Claims. (Cl. 343—112)

This invention relates to a computer system which is employed in conjunction with a plane hyperbolic to plane rectangular coordinate converter for initially determining independently of the converter the approximate bearing of an object with respect to the center station of a three-station configuration, employing this approximate value to stabilize the converter so as to eliminate erroneous values in its output and thereafter maintaining stability control of the converter to insure the production of the correct solutions.

The bearing $B_p$, is employed by the converter to convert the position representation of a rocket, aircraft or other moving vehicle from its hyperbolic coordinates, $\Delta L_a$ and $\Delta L_b$, to its rectangular coordinates, $X_p$ and $Y_p$. This conversion is achieved by mechanism outside the scope of this invention but which is in general a mechanization of the following equations for a three-station configuration designated A, B and C:

$$(L_a^2 - \Delta L_a^2)[\Delta L_b + L_b \cos(B_p - B_b)]$$
$$= (L_b^2 - \Delta L_b^2)[\Delta L_a + L_a \cos(B_p - B_a)] \quad (1)$$

$$X_p = L_p \sin B_p \quad (2)$$

$$Y_p = L_p \cos B_p$$

where $$L_p = \frac{1}{2} \frac{(L_a^2 - \Delta L_a^2) + (L_b^2 - \Delta L_b^2)}{[\Delta L_a + L_a \cos(B_p - B_a)] + [\Delta L_b + L_b \cos(B_p - B_b)]} \quad (3)$$

where $L_a$, $L_b$, and $L_p$ are the distances from the stations A and B and the vehicle P, respectively, to the central station C and $B_a$, $B_b$ and $B_p$ are the bearings from North of these stations, and the vehicle, respectively, with respect to the station C and where the hyperbolic coordinates $\Delta L_a$ and $\Delta L_b$ are defined by:

$$\Delta L_a = L_a - L_p \quad (4)$$

$$\Delta L_b = L_b - L_p \quad (5)$$

The desirability of the converter's admitting a general triangular configuration of ground stations rather than only a linear array is based on the frequent difficulty under battle conditions and for certain terrains of accomplishing a suitable colinear ground station array which is sufficiently close to the target.

It may be seen, however, that in general Equation 1 has two distinct solutions for $B_p$, only one of which is the true bearing of the vehicle. Hence, if no precautions were taken, for almost any bearing of the vehicle the converter might produce not the true bearing but an erroneous bearing. This erroneous value of $B_p$ frequently leads to corresponding erroneous values of $X_p$ or $Y_p$.

In general, the invention comprises dual means for reversing direction of the output of a servo motor in a bearing servo loop system of the converter thereby assuring the computation by the converter of the true vehicle bearing and position. It has been found that either of the solutions of Equation 1 for the bearing $B_p$ can be made stable or unstable in the converter according to the direction in which the servo motor is driven. In all cases, the invention reverses the direction of the servo motor output by reversing the reference line leads to the motor and thereby reversing the reference line voltage in the motor. If the solution is erroneous as determined by the mechanism provided by this invention, the stability control is made to reverse the reference line voltage so as to stabilize instead the other solution which must be the true one. The initial means for operating the stability control is an aircraft radio compass automatic direction finder (ADF) and its associated circuitry which roughly determine the true bearing of the vehicle and compares it with the converter solution. If the difference between them exceeds a certain tolerance, the stability control is caused to reverse the line leads so that the converter will effect the other solution as the stable one.

According to the invention a second means for operating the stability control is provided by additional circuitry associated with the coordinate converter. Analysis indicates conclusively that a single fixed setting of the aforementioned reference line leads stability control is not adequate for unlimited aircraft operation. To maintain the true vehicle bearing as the stable solution of the converter, the leads must be reversed when the vehicle crosses certain geographic lines determined by the three-stations. In order to avoid excessive reliance on the ADF control, which is coarse and only moderately accurate, the solution of the coordinate converter itself is employed in the invention to determine when the vehicle reaches such a line and it then directs the automatic reversal of the $B_p$ motor line leads. Thus, the ADF is employed only for the initial stability setting. It is always present, as a safety feature, to exert coarse control when excessive error appears and to effect a line-leads switch to eliminate the cause of error. In normal operation, however, after initial adjustment the more accurate coordinate converter monitors itself, via the invention, by directing the line-leads switch and the ADF is never again in control.

A more detailed description of the invention follows being taken in conjunction with the accompanying drawings, in which Fig. 1 is a schematic showing the invented dual means for controlling the stability of a three-station coordinate converter;

Fig. 2 shows graphically the regions for the dual solutions made by the coordinate converter;

Fig. 3 indicates graphically the solution performed by the computer for determining the region in which the aircraft or rocket is located according to which the phase in the servo leads is adjusted to stabilize the true bearing C solution in the computer; and Fig. 4 is a schematic of the $\beta$ computer.

According to Fig. 1 the numeral 4 indicates a bearing servo loop of the coordinate converter which instruments Equation 1 and in which there is provided a bearing computer 5, an output connection 6 connected to one contact of a double contact switch 7, a lead 8 connecting the input side of servo amplifier 9 to the switch 7, a lead 10 connecting the amplifier 9 to servo motor 11 which has an output shaft 12 which is in driven connection with computer feed-back shaft 13. The bearing computer 5 is of the type extensively used in analog converters. Such a computer is shown in detail in our copending application for an Analog Converter, Serial No. 678,264, which was filed August 12, 1957.

The polarity of the reference line voltage of the servo motor 11 is controlled by a stability control device comprising a line having leads 14 and 15 which are connected to a double pole switch 16 which serves to adjust the polarity on servo input leads 17 and 18 according to the connection of these leads with the line leads 14 and 15.

Throwing the switch reverses lead connections and hence alters the polarity in the input line leads which will in effect stabilize the converter's other solution when that adjustment is required as determined by the system which together with the polarity switching device embodies the invention.

The invention provides a dual means for operating the stability control devices as follows: A shaft 20 is operatively driven by the servo output shaft 12 and has mechanically represented thereon the quantity $B_p - B_a$ which is actually computed by the bearing computer 5. A differential shaft 21 is in driven connection with shaft 20 and feeds this quantity to differential 22. The bearing $B_a$ is introduced to the other side of the differential 22 by means of shaft 23. The computed quantity $B_p$ is employed to drive control transformer 24 which is connected to the differential 22 by means of shaft 25 and shaft 26. The control transformer 24 is energized by differential generator 27 which is connected therewith by means of lead 28. The differential generator 27 is driven by means of automatic direction finder 30 which is connected to the differential generator by lead 31 and is employed to determine an approximate bearing $B_p'$ of the vehicle. The control transformer 24 serves to compare $B_p$ the bearing computed by the converter with $B_p'$ the bearing found by the automatic direction finder 30 and to yield $\sin(B_p' - B_p)$ the sine of the difference of the comparison.

The other contact of the switch 7 is connected to the control transformer 24 by lead 32 which is also connected to an amplitude detector 33 through branch lead 34. A relay coil 35 is connected to the detector 33 by lead 34a. When the computed difference $\sin(B_p' - B_p)$ exceeds a selected tolerance the amplitude detector energizes the relay coil 35 which then operates the switch 7 to remove the computer 5 temporarily from the servo loop 4 and to substitute the automatic direction finder line 32 therefor. Thus the system is adapted to place the compass value $B_p'$ for the vehicle bearing in the servo loop if on comparison with the converter-computed bearing $B_p$ the latter is found to be an erroneous solution. The stability control switch 16, which is actuated by relay coil 36 is operatively removed from the system due to the fact that the connection 37 for the latter is opened by means of the relay coil 35, shaft 38 and switch 39 which connects the relay coil 36 with the rest of the system described below. Thus, when the automatic direction finder is in control for determining $B_p$, there is, of course, only one bearing solution and so the stability control is suspended. As soon, however, as the computer is set on the basis of the nearly true bearing solution $B_p'$ as determined by the automatic direction finder instead of the erroneous solution as established by the computer, the amplitude detector 33 operates through the relay coil 35 and switch 7 to remove the automatic direction finder from the servo loop and place the computer 5 back therein and actuates the switch 39 so that the stability control is restored and enabled to select the proper polarity orientation in accordance with a signal produced by the second and primary means for operating the stability control. The computer then continues to indicate the true solution and reject the erroneous solution by the means which will now be described.

It has been found that the polarity of the servo reference leads must be changed when the vehicle passes from one region into another. Principally, for this reason means must be provided for operating the stability control to reverse the servo leads after the computer has been initially set by the automatic direction finder.

In order to understand the reason for the establishment of the regions and the determination of the location of the vehicle within them by electro-mechanical computations, it is necessary to analyze the nature of the true and erroneous bearing roots which the servo loop 4 is adapted to yield.

Analytic investigation has demonstrated the nature and the location of the erroneous roots. For convenience they are classified into two mutually exclusive and exhaustive categories, namely, ambiguous roots and extraneous roots. In every case there is exactly one erroneous root, either ambiguous or extraneous. An ambiguous root is an erroneous root which appears when the hyperbolic information of the three-station system is inadequate to distinguish between the true position of the vehicle and a corresponding erroneous position, i.e., when there are two distinct points having the same hyperbolic coordinates $\Delta L_a$ and $\Delta L_b$. An extraneous root is an erroneous root which appears as a solution of the derived Equation 1 but which is not due to any inherent ambiguity in the characterizing of the vehicle position by its hyperbolic coordinates.

The distribution of ambiguous and extraneous roots is illustrated in Figure 2 for a typical triangular ground station configuration A, B, C. When the vehicle is located in one of the regions of ambiguity (shaded) there exists a corresponding ambiguous point which is in that same region. In greater detail: For a vehicle position at point P in $R_2$ the ambiguous root corresponds to point Q in $R_2'$; and for a vehicle located at Q the ambiguous point is at P. If the true position of the vehicle is in $R_4$, the unshaded region of extraneous roots, then there corresponds an extraneous root which is also in $R_4$.

The elimination of both ambiguous and extraneous roots is of course obligatory in order that the computer always indicate the true position of the vehicle. The ambiguous solutions result from the inadequacy of the three station hyperbolic coordinates and so can be eliminated only by providing additional information to the computer. The invention utilizes supplemental information from the automatic directional finder to eliminate both the extraneous solutions and the ambiguous roots.

Analytic investigations have shown in every case, that of the true and erroneous roots one is a stable solution and the other is unstable. The computer, of course, will invariably supply the stable solution, automatically rejecting the unstable one. To assure the continuous, automatic selection of the true solution it is only necessary then to effect a stability control which always renders the erroneous root unstable. Such a control is achieved in the invention described herein.

It is known that, under any circumstances the stable root can be made unstable and the unstable root stable by reversing the leads of the reference line of the servo motor in the bearing servo loop. The results of additional mathematical study of the specific requirements for stability control are best described with the aid of Figure 3. One position of the servo motor reference line leads is required to stabilize the true root when the vehicle is in any one of the shaded regions $R_1$, $R_2$, $R_3$ while the other position of the line phase is needed to stabilize the true root when the vehicle is in one of the unshaded regions $R_4$, $R_5$, $R_6$, $R_7$. $R_4$ is the interior of the triangle with vertices A, B, C. What then is needed is some means to determine which of the regions contains the vehicle and to switch the reference line polarity accordingly. Ambiguous and extraneous roots alike will thus be eliminated.

This proposed section of the computer determines whether the indicated solution is in regions $R_1-R_3$ or $R_4-R_7$ by determining on which side of each of the three infinite lines AB, BC, CA it lies. The position with respect to CA and BC is easily obtained by observing whether the angles $B_p - B_a$ and $B_p - B_b$ lie between 0° and 180° or between 180° and 360°. The coordinate converter does not, however, provide explicitly any indication of the side of line AB on which the vehicle location lies. It appears that the simplest way to determine the position of the computed solution with respect to the line AB is to compute the bearing $\beta$ of line from B to the indicated vehicle position, to supply the bearing α of the line from B to A as a hand input, and then to determine if β−α is between 0° and 180° or between 180° and 360°. The invention includes mechanism to perform these computations and angle measurements.

It is therefore the function of this section of the invention to pass a signal to the stability control (when switch 39 is closed) to actuate the line reversing switch 16 therein in accordance with the location of the vehicle in the regions $R_1$—$R_3$ and $R_4$—$R_7$. The signal has its source on line 40 (Fig. 1) and is either interrupted or permitted to flow to the stability control (when switch 39 is closed) depending on a unique switching system which is described as follows:

The system comprises two branches lines 41 and 42 which are adapted to be connected selectively to the line 40 by means of switch 43. At the other end thereof line 41 is adapted to be connected to line 45 by means of switch 46. The other end of line 42 is permanently connected to line 45. There is provided in the branch 41 a switch 47a and a corresponding switch 47b in the branch 42. The switch 47a serves to close and open the connection between the switch 43 and switch 46 in the line 41 while the corresponding positions of switch 47b serves to close the connection between the switch 43 and the line 45 in the line 42 or alternately to connect the switch 43 with the switch 46 by means of lead 48 which connects one contact of switch 47b and the switch 46.

The switches are actuated as follows:

The shaft 25 on which the angular quantity $B_p$ is represented is connected to one side of differential 50 the other side of which is actuated by shaft 51 on which there is placed the known angular quantity $B_b$. The differential output shaft 52 having the quantity $B_p - B_b$ represented thereon is employed to drive cam 54. A cam follower shaft 55 actuates the switch 43 and hence determines which branch of the switch system will be connected to the signal line 40.

The angle α is placed into one side of differential 56 by means of shaft 57. The angle β is computed in unit 58 (Fig. 4) from the value of $L_b$ introduced on shaft 63, the value of $B_b$ introduced on shaft 53, and the values of $-X_p$ and $-Y_p$ transmitted from computer 5 via lines 81 and 82 respectively, and feeds that angle into the other side of the differential 56 on shaft 59. Hence, differential output shaft 60 is adapted to transmit the quantity β−α to cam 61 the follower shaft 62 of which simultaneously actuates the switches 47a and 47b.

The switch 46 is actuated by means of cam 64 which is in driven connection with the shaft 20, through shaft 65. Cam follower shaft 66 of the cam 64 is connected to the switch 46 and serves to make and break the connections between branch 41 and lead 48 with the line 45.

Each of the cams actuates its switch, to upper switch positions in Figure 1, when its angular input lies between 0° and 180° and releases it for angles between 180° and 360°. The switching circuit results (when switch 39 is closed) in the control signal activating the stability control relay when the computed position is in regions $R_1$, $R_2$, or $R_3$ and releasing it when that position is in $R_4$, $R_5$, $R_6$, or $R_7$. This is apparent upon comparing the following table, obtained exclusively from geometric considerations to the behavior of the switching circuit.

|  | $B_p-B_a$ | $B-\alpha$ | $B_p-B_b$ |
|---|---|---|---|
| $R_1$ | + | − | + |
| $R_2$ | + | − | − |
| $R_3$ | + | + | − |
| $R_4$ | − | + | + |
| $R_5$ | + | + | + |
| $R_6$ | + | − | + |
| $R_7$ | − | + | − |

Here + indicates that the appropriate angle is between 0° and 180° whereas − indicates the angle to be between 180° and 360°.

The computor in box 58 is schematically shown in Fig. 4.

A shaft 63 is settable in accordance with a quantity $L_b$, which is the distance from the ground station C to the ground station B. This quantity is converted by a linear potentiometer 63b to a proportional voltage representing $L_b$, which is transmitted via line 63a to a summing network 67. The network 67 transmits an output voltage to resolver 69 through amplifier 68. Line 70 transmits a feedback voltage from resolver 69 to the summing network 67 for the purpose of nulling the same when the feedback voltage and the voltage on line 63a have been equated.

A shaft 53 is settable in accordance with a quantity $B_b$, which is the bearing from north of the line from station C to station B, and said shaft 53 positions resolver 69.

The outputs of the resolver 69 representing $X_b$ and $Y_b$, the east and north rectangular coordinates respectively of the station B, where; $X_b = L_b \sin B_b$ and $Y_b = L_b \cos B_b$, are transmitted on lines 71 and 72 respectively to summing networks 73 and 74, respectively.

Network 73 also receives the quantity $-X_p$ on line 81 from computer 5, and a feedback voltage on line 80 from resolver 77. Similarly network 74 also receives the quantity $-Y_p$ on line 82 from computer 5, and a feedback voltage on line 87 from resolver 77. The said feedback voltages are provided for purposes of stability and linearity.

An output voltage from resolver 77 is transmitted via line 83 to servo amplifier 84 and thence to servo motor 86 via line 85. Servo motor shaft 87 positions resolver 77 via resolver shaft 88. The servo loop 100 comprising resolver 77, servo amplifier 84, servo motor 86 and associated lines and shafts acts to compute β on shaft 59, which is connected to shaft 87, in accordance with the following equation:

$$(Y_b - Y_p) \sin \beta = (X_b - X_p) \cos \beta \qquad (6)$$

This computation is performed by the servo loop in that it nulls the output voltage on line 83 which is proportional to the quantity $$(Y_b - Y_p) \sin \beta - (X_b - X_p) \cos \beta$$

Potentiometer 99 is employed to control the gain of amplifier 84 so as to maintain the gain of the servo loop 100 constant. Said potentiometer 99 is positioned by the shaft 95 of servo loop 101. Said output shaft 95 representing the quantity $\sqrt{(X_b - X_p)^2 + (Y_b - Y_p)^2}$, the distance between station B and vehicle P. This quantity is computed by servo loop 101 in the following manner.

A second output voltage from resolver 77 is transmitted via line 89 to summing network 90. The output of said network 90 is transmitted to a servo amplifier 92 via line 91 and thence to servo motor 94 via line 93. Servo motor shaft 95 positions potentiometer 97 via potentiometer shaft 96. Said potentiometer 97 transmits a proportional voltage to network 90 via line 98.

Said second output voltage of resolver 77 represents the quantity $(X_b - X_p) \sin \beta + (Y_b - Y_p) \cos \beta$, which by virtue of Equation 6 is equal to the value of $$\sqrt{(X_b - X_p)^2 + (Y_b - Y_p)^2}$$

which value is represented on shaft 95 by the repeating operation of the servo loop 101.

The arrangement of the computer is such that it can easily accommodate means for solving more than a single three station configuration. The connections may be duplicated as many times as desired if more than a single aircraft or missile is to be accommodated on the basis of a plurality of sets of stations and the connections would necessarily be controlled by a station selector signal.

Other modifications may be effected within the scope of the invention without departing therefrom as defined in the following claims:

We claim:

1. A computer for operating a stability control device for a three station phase comparison system employing a servo loop which includes a three station bearing computer and a servo motor, comprising, an automatic direction finder, means for selectively connecting said automatic direction finder or said bearing computer in said servo loop, a stability control device having a two phase input connected to the servo motor in the servo loop and adapted to reverse the phase thereon, make and break means controlled by said automatic direction finder for suspending said stability control device while the automatic direction finder is connected into said servo loop and means connected to said servo loop and said automatic direction finder for nulling the output thereof when said output has been placed into said servo loop and computing means connected to said servo loop for determining the location of the vehicle within designated regions determined by the three station configuration, said means being adapted to be connected to said stability control device for operating the same according to the location of the vehicle within the computed regions.

2. A computer for operating a stability control device for a three station phase comparison system employing a servo loop which includes a three station bearing computer and a servo motor, comprising, an automatic direction finder for roughly computing the bearing of an aircraft with respect to the central ground station, comparison means connected to said automatic direction finder, selective means adapted to connect said comparison means into said servo loop and disconnect said bearing computer therefrom, said comparison means being connected to the output side of said servo loop, whereby the computer output in the servo loop may be compared with the output of said automatic direction finder, a stability control device having a two phase input connected to the servo motor in the servo loop and adapted to reverse the phase thereon, make and break means connected to said stability control device and to said comparison means, whereby said stability control may be suspended while the automatic direction finder is connected to the servo loop and restored thereafter, computing means for determining the location of the aircraft within designated regions determined by the three station configuration, said means being adapted to be connected to said stability control device for the servo motor while the automatic direction finder is disconnected from said servo loop and the computer is restored therein, said computing means being permanently connected to the output of said servo loop, and means for setting into said computing means quantities representing the angles formed by virtual lines drawn from each station to the computed location of the aircraft and lines representing the virtual sides of the triangle formed by the three stations whereby the orientation of the phase of the servo motor input as controlled by said computing means is dependent on the continually corrected location of the aircraft within the computed region.

3. A computer for operating a stability control device for a three station heterodyne phase comparison system as claimed in claim 2 wherein said computing means comprises a pair of branch leads, switching means adapted to connect selectively one end of said branch leads to a signal source, one of said branch leads being connected directly to the output and having a second switching means provided therein, circuit make and break means adapted to connect the other end of said other branch lead to the output, second circuit make and break means in the other branch lead, a lead adapted to connect said branches between said second switching means and the first mentioned circuit make and break means, and shafts settable in accordance with quantities representing the angles formed by virtual lines drawn from each station to the computed location of the aircraft and lines representing the virtual sides of the triangle formed by the three stations and two speed cams in driven connection with said shafts and in driving connection respectively with said first mentioned switching means, said second switching means and said second circuit make and break means, and said first mentioned switching means, said second switching means and said second circuit make and break means, and said first mentioned make and break means, said two speeds cam being set for angles from 0° to 180° and angles from 180° to 360°.

4. Computing means for determining the location of aircraft within designated regions determined by a three station configuration comprising a pair of branch leads, switching means adapted to connect selectively one end of said branch leads to a signal source, one of said branch leads being connected directly to the output and having a second switching means provided therein, circuit make and break means adapted to connect the other end of said other branch lead to the output, second circuit make and break means in the other branch lead, a lead adapted to connect said branches between said second switching means and the first mentioned circuit make and break means, and shafts settable in accordance with quantities representing the angles formed by virtual lines drawn from each station to the computed location of the aircraft and lines representing the virtual sides of the triangle formed by the three stations and two speed cams in driven connection with said shafts and in driving connection respectively with said first mentioned switching means, said second switching means and said second circuit make and break means, and said first mentioned make and break means, said two speeds cam being set for angles from 0° to 180° and angles from 180° to 360°.

5. A computer for operating a stability control device for a three station heterodyne phase comparison system employing a servo loop which includes a three station bearing computer and a servo motor comprising an automatic direction finder for roughly computing the bearing of an aircraft with respect to the central station of the three station configuration, computing means connected to the output of said servo loop for determining the location of the aircraft within designated regions determined by the three station configuration selective means for replacing the computer in said servo loop with said automatic direction finder, a stability control device connected to said servo motor and adapted to reverse the phase of its input, said stability control device being operatively and selectively connected to said computing means and means connected to said automatic direction finder and the operating connection of the stability control device and the computing means for breaking said operating connection and rendering the stability control device inoperative.

No references cited.